(12) United States Patent
Boundy

(10) Patent No.: US 6,981,022 B2
(45) Date of Patent: Dec. 27, 2005

(54) USING PSTN TO CONVEY PARTICIPANT IP ADDRESSES FOR MULTIMEDIA CONFERENCING

(75) Inventor: Mark N. Boundy, Phoenix, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 813 days.

(21) Appl. No.: 09/985,696

(22) Filed: Nov. 2, 2001

(65) Prior Publication Data

US 2003/0088619 A1  May 8, 2003

(51) Int. Cl.[7] ................. G06F 15/16; H04M 3/42; H04N 7/14; H04Q 11/00

(52) U.S. Cl. ............... 709/204; 709/205; 379/202.01; 348/14.08; 370/260

(58) Field of Search ............... 709/204–207; 379/202.01; 348/14.08–14.11; 370/260–265

(56) References Cited

U.S. PATENT DOCUMENTS

| | | | | |
|---|---|---|---|---|
| 6,671,262 B1 * | 12/2003 | Kung et al. | ............... | 370/260 |
| 6,728,784 B1 * | 4/2004 | Mattaway | ............... | 709/245 |
| 6,785,246 B2 * | 8/2004 | Foti | ............... | 370/261 |
| 2001/0056466 A1 * | 12/2001 | Thomspon et al. | ......... | 709/204 |
| 2002/0107923 A1 * | 8/2002 | Chu et al. | ............... | 709/205 |
| 2003/0014488 A1 * | 1/2003 | Dalal et al. | ............... | 709/204 |
| 2004/0022235 A1 * | 2/2004 | Vaziri et al. | ............... | 370/352 |

* cited by examiner

*Primary Examiner*—Krisna Lim
*Assistant Examiner*—Yasin Barqadle
(74) *Attorney, Agent, or Firm*—David J. Zwick; Steven R. Santema

(57) ABSTRACT

An IP/PSTN hybrid multimedia conferencing system in which standard telephone and user station participants establish voice communications over the PSTN, and then exchange IP addresses in-band over the PSTN. User stations then negotiate capabilities over the IP network. All users can participate at a base voice level over the PSTN while user stations can also establish extra-audio media streams over an IP network.

24 Claims, 5 Drawing Sheets

USING PSTN TO CONVEY PARTICIPANT IP ADDRESSES FOR MULTIMEDIA CONFERENCING

FIELD OF THE INVENTION

The present invention relates to multimedia conferencing, and more particularly to transmitting the IP address of the conference master or MCU over the public switched telephone network.

BACKGROUND OF THE INVENTION

Multimedia conferencing, in which voice, image, data and video are shared among conference call participants, typically is conducted entirely within a packet mode of operation. Audio and extra-audio information is packetized at the end user station and is typically transmitted over a managed Internet Protocol (IP) network. A problem with this approach is that such a conference call is limited to participants with extra-audio capable user stations. Thus, a would-be participant having access only to a standard telephone instrument, referred to herein as a POTS (Plain Old Telephone Service) user, would not be able to participate in the conference in any capacity. Another problem with this approach is that user stations will often broadcast address request messages to determine the appropriate multipoint control unit (MCU). This may present security problems.

In light of these problems, it is desirable to have a multimedia conferencing system that will allow POTS users to participate at a base voice level. It is also desirable to transmit conference master or MCU addresses in a secure manner.

SUMMARY OF THE INVENTION

Accordingly, it is an object of the present invention to describe a multimedia conferencing environment in which the voice portion of the conference call takes place over the public switched telephone system (PSTN), and in which the IP address of the conference master or MCU is transmitted in-band over the PSTN, thus allowing extra-audio capable participants to conduct the extra-audio portion of the conference over an IP network.

The present invention is a hybrid multimedia conferencing system in which participants establish voice communications over the PSTN, and then exchange IP addresses in-band over the PSTN. The IP addresses are then available to establish extra-audio media streams over a packet network. Extra-audio capable user stations exchange IP address information over the voice communication channels, with subsequent extra-audio communications between user stations taking place over the packet network as unicast or multicast messages.

For participants on user stations connected to the packet network, voice communications are directed over the PSTN via gateways. When a user station joins the conference call, it transmits its IP address in-band over its PSTN voice connection. A conference master responds by sending its IP address over the PSTN voice connection. Extra-audio connections are then negotiated and established between the user station and the conference master over the packet network via unicast messages. After establishment of extra-audio connections, subsequent communications over these channels between user stations takes place as unicast or multicast messages over the IP network.

Since participants establish and maintain an audio teleconference over the PSTN, participants that are not extra-audio capable, such as POTS users, are still able to participate at the base voice level. Also, all participants may make full use of the teleconferencing capabilities and features of the PSTN service provider.

Because extra-audio connection information is transmitted in-band over the PSTN connection to parties of the conference call and not communicated outside of the telephone call, security of the system is enhanced.

DESCRIPTION OF THE PREFERRED EMBODIMENTS

Figure 1:
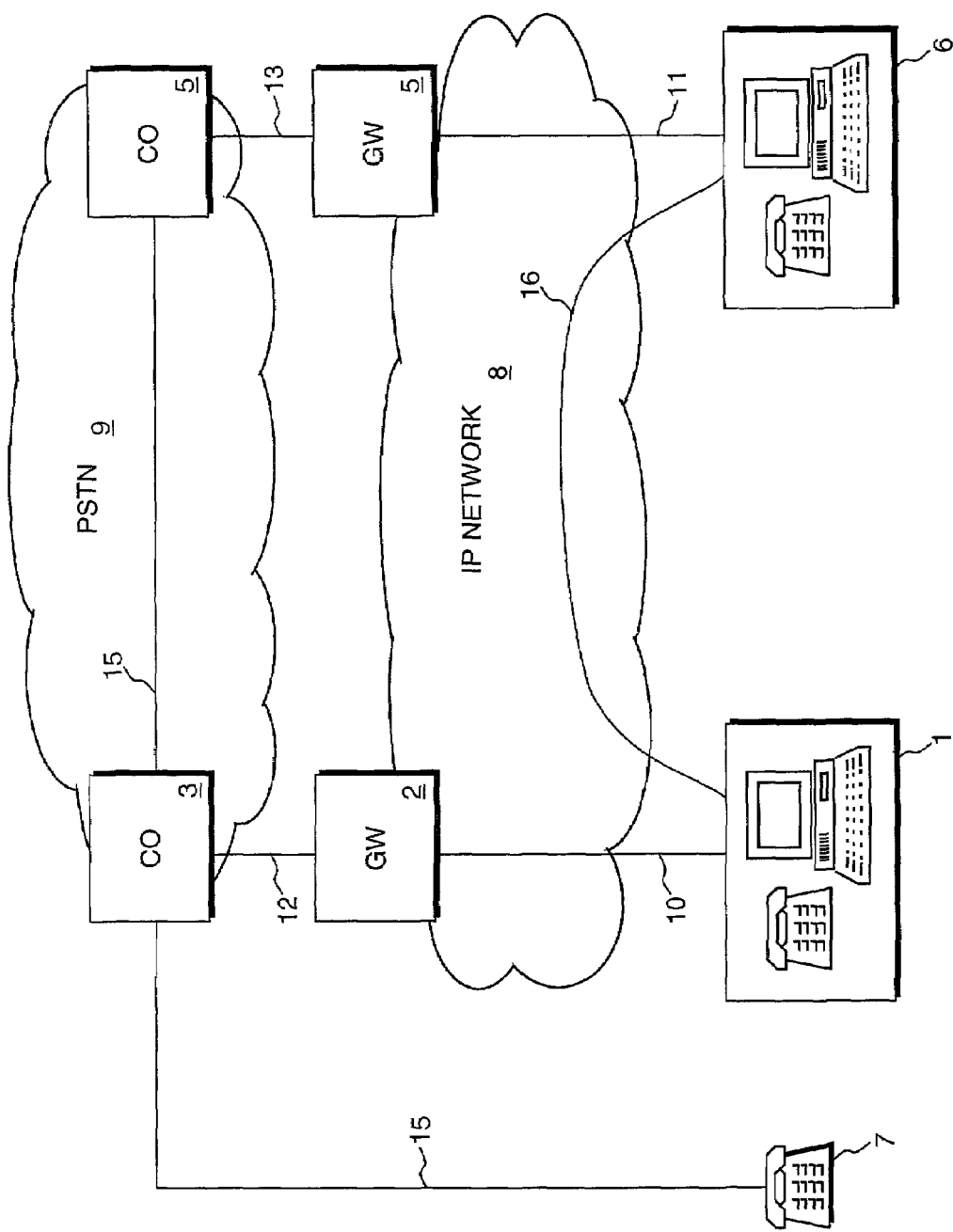
FIG. 1 shows a block diagram of a first embodiment of the present invention.

FIG. 1 shows a block diagram of a preferred embodiment of the present invention. User stations 1 and 6 are multimedia terminals capable of supporting at least voice and typically other types of extra-audio connections to a packet network. The multimedia user stations are typically PC based, and can support a variety of real-time or near real-time collaborative applications such as electronic whiteboarding and document sharing. These user stations are referred to herein as extra-audio capable. Telephone 7 is a standard telephone instrument that can operate over a switched circuit network, such as a private network or the Public Switched Telephone Network (PSTN). Telephone 7 is not extra-audio capable and is referred to herein as a POTS user. In the preferred embodiment, IP network 8 is a packet based managed Internet Protocol (IP) network such as a LAN, WAN or MAN. IP network 8 can also be the Internet. In the preferred embodiment, PSTN 9 is the switched circuit PSTN. Network 9 may also be a private switched circuit network. Gateways 2 and 5 are network devices that perform the network and signaling translation required for the interworking of IP network 8 and PSTN 9. Gateways 2 and 5 provide for the interworking of networks 8 and 9 by, in particular, translating protocols for call setup and release and transferring information between the networks 8 and 9. In the preferred embodiment, gateways 2 and 5 are iMerge Centrex Feature Gateways manufactured by AG Communication Systems, Inc. iMerge is a registered trademark of AG Communication Systems. Gateways 2 and 5 can be other gateway devices that support well known gateway functions as well as functions required for the present invention. Central office (CO) switches 3 and 4 are designed and engineered to operate in switched circuit network PSTN 9, and to operate with gateways 2 and 5. In the preferred embodiment, CO switches 3 and 4 are GTD-5 EAX Central Office Switches manufactured by AG Communication Systems, Inc. GTD-5 is a registered trademark of GTE Corporation.

User stations 1 and 6 are connected to IP network 8 over standard TCP/IP connections. Links 10, 11 and 16, which connect user station 1 to gateway 2, user station 6 to gateway 5 and user station 1 to user station 6, respectively, are logical links through IP network 8. These links typically comprise a wide variety of transmission equipment. Gateways 2 and 5 would typically be connected to IP network 8 over 10/100baseT Ethernet connections, and connected to CO switches 3 and 4 over GR-303 connections 12 and 13. Connection 14 between central office switches 3 and 4 represents a logical connection through PSTN 9. This connection will typically comprise a wide variety of switches and transmission equipment. Communications between CO switches 3 and 4 is well known in the art. Telephone instrument 7 is connected to central office switch 3 over a standard subscriber line connection.

User stations 1 and 6 will typically support a variety of packet based protocols allowing Voice Over IP (VOIP) communications over IP network 8, and also communications over PSTN 9 via gateways 2 and 5. These protocols include, for example, TCP/IP, H.323, SIP and SDP. Operation of a H.323 network is described, inter alia, in standards publications "H.323 Packet-Based Multimedia Communications Systems," November 2000, and "H.225.0 Call Signalling Protocols and Media Stream Packetization for Packet-Based Multimedia Communication Systems," November 2000, both published by the Telecommunication Standardization sector of the International Telecommunication Union (ITU-T), and both hereby incorporated by reference. SIP and SDP are described in the Internet Engineering Task Force standards documents "RFC 2543—SIP: Session Initiation Protocol," March 1999, and "RFC 2327—SDP: Session Description Protocol," March 1999, both published by The Internet Society, and both hereby incorporated by reference.

User stations 1 and 6 are also equipped with a special purpose IP address sharing application software (special purpose software) that allows the workstations to practice the current invention. This address sharing software could, for example, be initiated at user station startup by, for example, including a shortcut file referencing the address sharing software in the user station Startup folder. The address sharing software could also be initiated when a VOIP call is initiated, or manually initiated by the user station operator.

In operation of a first embodiment, user stations 1 and 6 and POTS user 7 establish an audio conference call over IP network 8 and PSTN 9 over connections 10–15. In the preferred embodiment, user station 1 calls user station 6 and establishes a call. User station 1, using the conference call Centrex feature, then sends flash hook and calls user station 6 and establishes a call. In similar fashion, POTS user 7 is added to the conference call. Establishing the conference call may be accomplished using a variety of known methods, including the use of Centrex features or dial-in teleconference bridging services available from PSTN service providers, or VOIP gateway services to the PSTN available from internet service providers.

After the conference call between user stations 1 and 6 and POTS user 7 has been established, one of user stations 1 and 6, for example user station 1, invokes the special purpose software. This establishes user station 1 as the conference master. The special purpose software on user station 1 then transmits the IP address of user station 1 over the PSTN to all other audio conference participants. In the preferred embodiment, the IP address of user station 1 is transmitted in an in-band message in FSK format. The IP address message may also be transmitted in other in-band acoustic signaling protocol formats, for example DTMF, or in out-of-band formats, for example ISDN. From a practical standpoint, in-band formats and transmit/receive methods that are less audibly disruptive to conference participants are obviously preferred. The layout of the IP address message can be arbitrary, or it can follow established protocols, for example ADSI. The IP address message, in addition to the IP address, may contain a unique call identifier or registration/authorization token to associate all IP address messages related to this conference call or transaction. The call identifier or token is included in the response messages to user station 1 in order to authenticate and to ensure that the request for connection is being made by a party to the voice conference, not simply a random incoming call from some other party at an inopportune time.

All other user stations on the audio conference call having the special purpose software installed (User station 6 in the preferred embodiment illustrated in FIG. 1) receive and decode the IP address message from user station 1.

User station 6 then negotiates multimedia capabilities with the conference master user station 1. The capabilities negotiation takes place over logical connection 16 of IP network 8. In the preferred embodiment, the SIP protocol is used for the negotiation. In general, other protocols that support capabilities negotiation may be used, for example H.323.

After capabilities negotiation has completed between conference master user station 1 and the other user stations on the audio conference call, extra-audio conferencing between user stations may begin.

Figure 2:
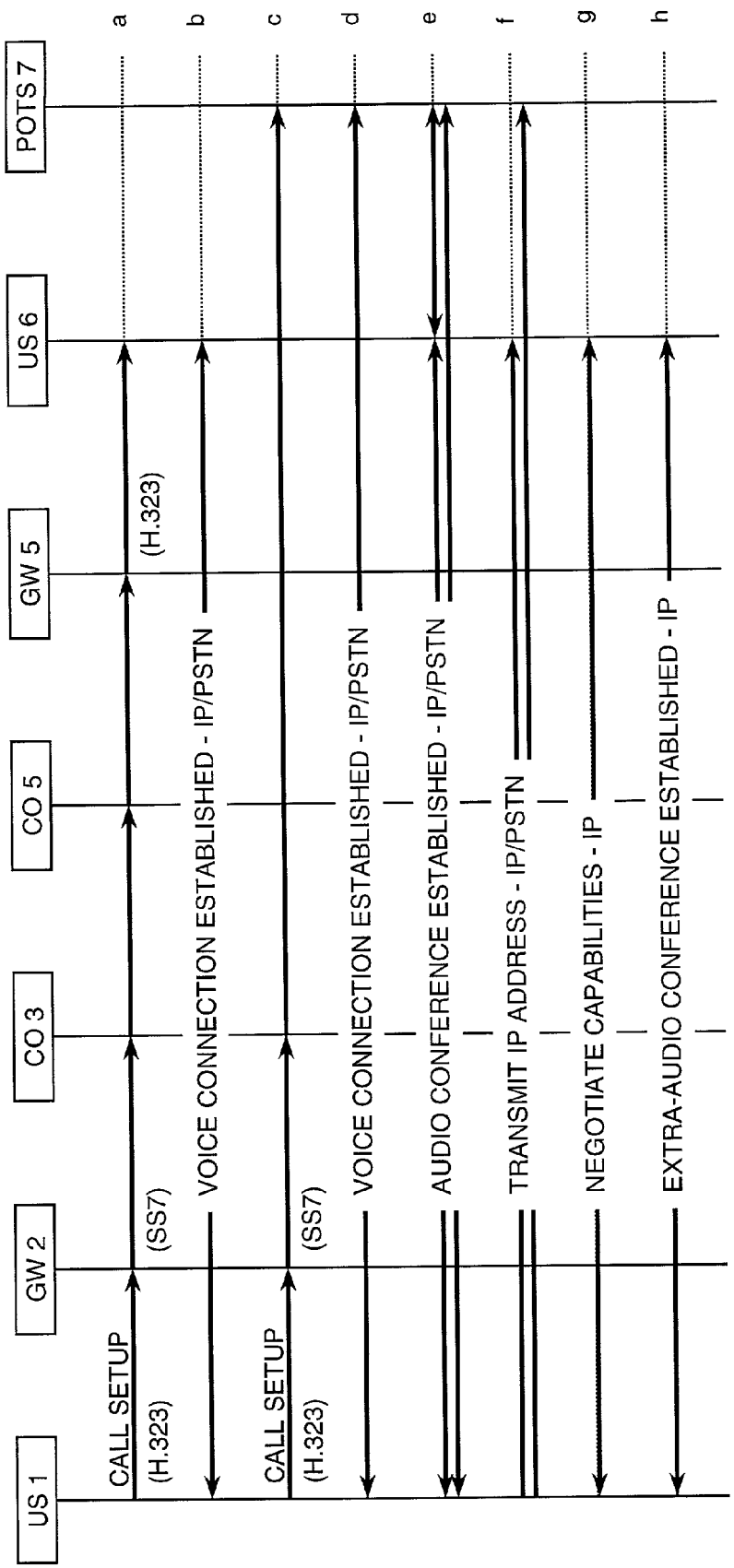
FIG. 2 shows a message flow diagram of the first embodiment of the present invention.

FIG. 2 shows a message flow diagram of the preferred embodiment of FIG. 1. At (a), user station 1 initiates an H.323 call to user station 6. The call segments between user station 1 and gateway 2, and gateway 5 and user station 6 take place over IP network 8. The call segments between gateway 2 and CO 3, CO 3 and CO 4, and CO 4 and gateway 5 take place over the PSTN using the Signaling System 7 (SS7) signaling network. The H.323 and SS7 messages transmitted to initiate the call are well known.

At (b), user station 6 accepts the call, responds back to user station 1, and a voice connection over PSTN 9 and IP network 8 is established. The H.323 and SS7 messages transmitted to accept and establish the call are well known.

At (c), user station 1, using the Centrex conference feature of CO 3, initiates a second call to POTS user 7. The call segment between user station 1 and gateway 2 takes place over IP network 8. The call segment between gateway 2 and CO 3 takes place over the PSTN using the Signaling System 7 (SS7) signaling network.

At (d), POTS user 7 answers and establishes the call between user station 1 and POTS user 7.

At (e), user station 1 establishes an audio conference between user station 1, user station 2 and POTS user 7.

At (f), user station 1 transmits its IP address in an in-band FSK format message to user station 6 and POTS user 7.

At (g), user station 6 negotiates multimedia capabilities with user station 1. The negotiation is conducted using SIP over IP network 8.

At (h), user stations 1 and 6 may establish an extra-audio conference over logical connection 16 of IP network 8.

Figure 3:
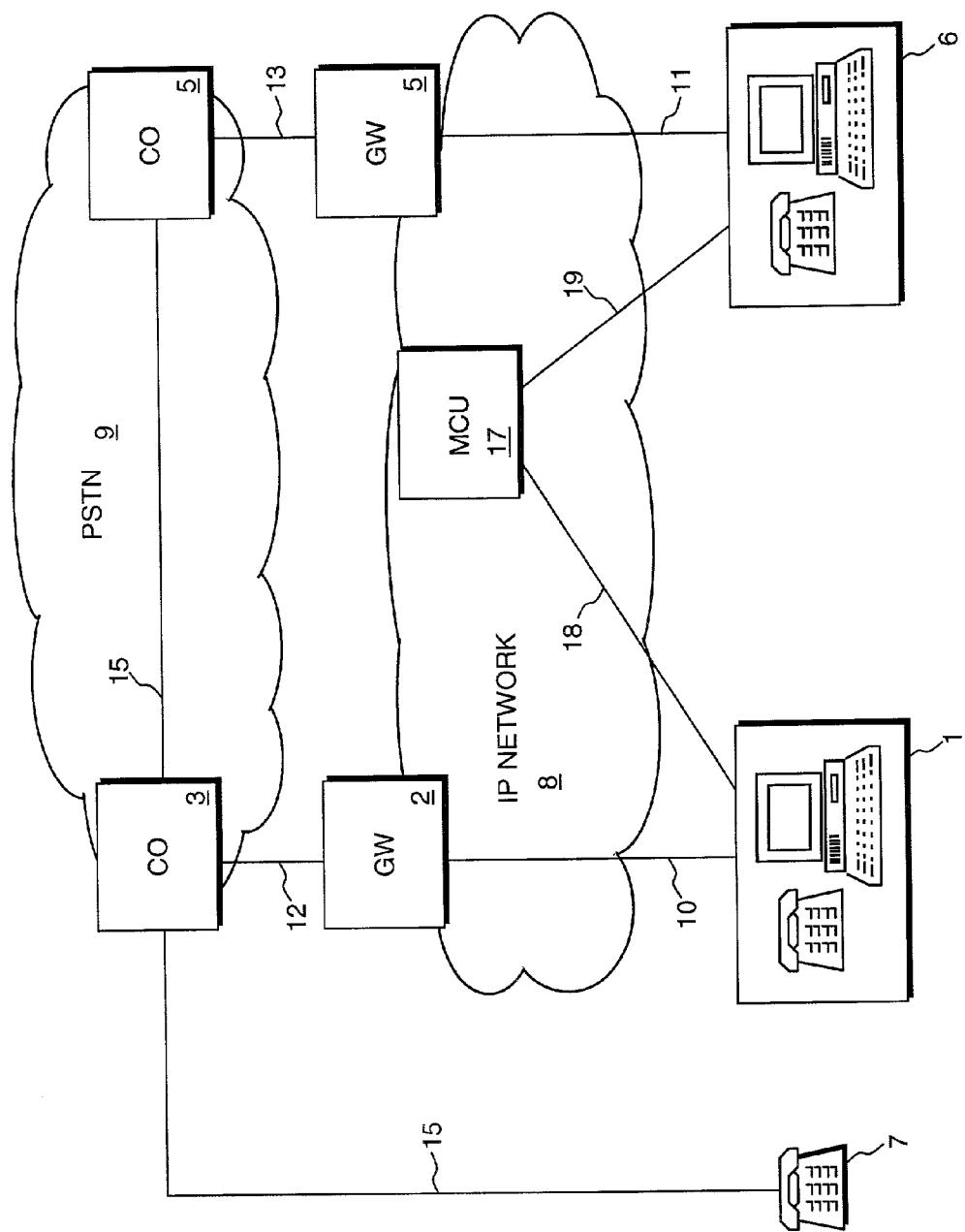
FIG. 3 shows a block diagram of a second embodiment of the present invention.

FIG. 3 shows a second embodiment of the present invention in which an H.323 multipoint conference unit (MCU) 17 is used. The operation of this embodiment is very similar to the embodiment of FIG. 1, with the following exceptions. The IP address transmitted in-band from user station 1 to the other audio conference participants is that of MCU 17. The capabilities negotiation takes place between MCU 17 and user stations 1 and 6. The extra-audio conference is established between MCU 17 and user stations 1 and 6, and is controlled by MCU 17.

Figure 4:
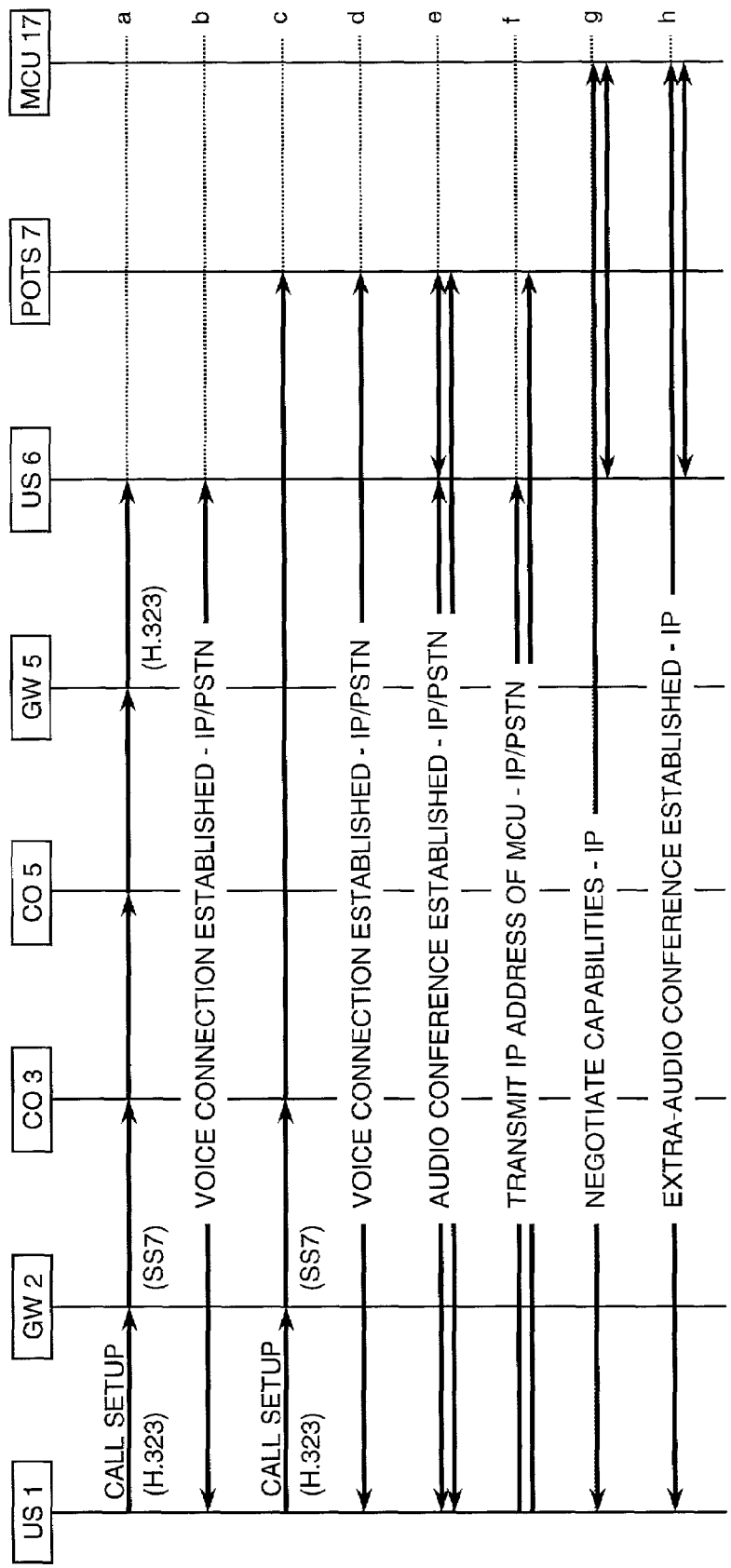
FIG. 4 shows a message flow diagram of the second embodiment of the present invention.

FIG. 4 shows a message flow diagram of the preferred embodiment of FIG. 3. The message flow of this embodiment is very similar to the message flow illustrated in FIG. 2, with the following exceptions. At (f), user station 1 transmits the IP address of MCU 17. At (g), user stations 1 and 6 negotiate capabilities with MCU 17. At (h), the extra-audio conference is established between MCU 17 and user stations 1 and 6, and is controlled by MCU 17.

In the preferred embodiments of the present invention, the IP address transmitted in-band by user station 1 may also be a DHCP (Dynamic Host Protocol) or other temporary address as only the active address is required. Also, IP endpoints may use proxy servers to negotiate connections on their behalf, and perform media multiplexing, address resolution, etc.

In an alternative embodiment, user stations on the conference call may respond to the IP address message from user station 1 with a PSTN in-band message containing their IP addresses. This allows all user stations to receive all other user stations' IP addresses, which may be stored and used to establish private sidebar sessions, separate from the main conference, between two or more user station participants.

Figure 5:
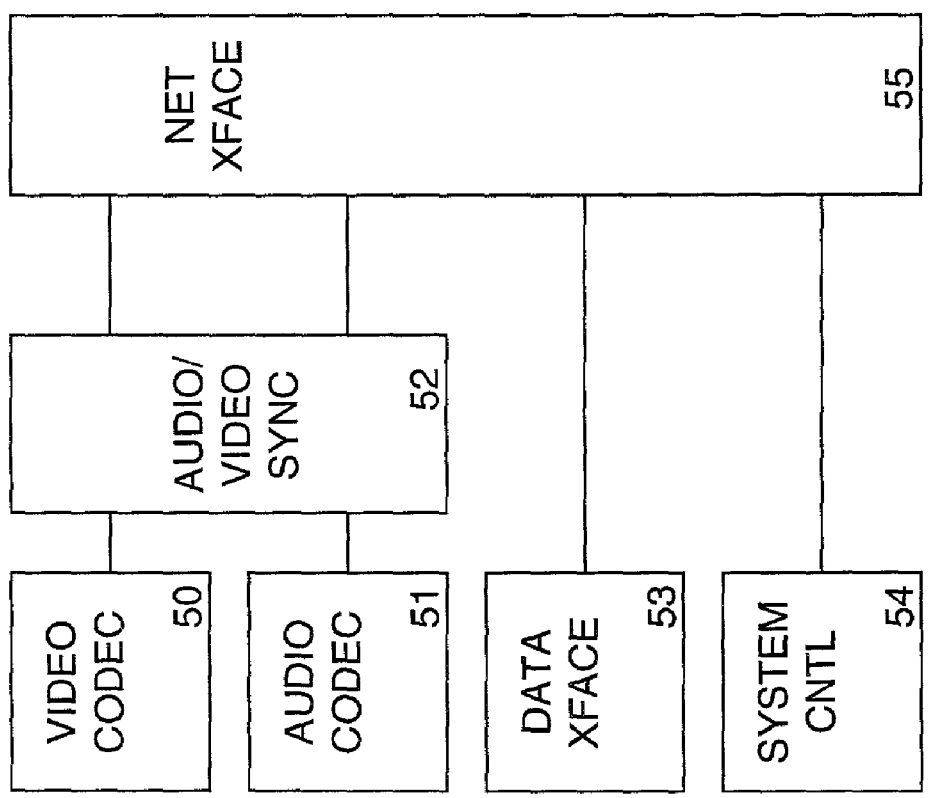
FIG. 5 shows a block diagram of a user station of the present invention.

FIG. 5 shows a block diagram of a multimedia user station of the present invention. Video codec 50 encodes video received from a video source, such as a camera, for transmission, and decodes video code received from the network for output to a video display. Audio codec 51 encodes the audio signal from a microphone for transmission, and decodes audio code received from the network for output to a loudspeaker. Audio/video synchronization 52 operates to control jitter from the received audio and video streams, and to achieve lip synchronization between these streams. Data interface 53 supports data based applications such as whiteboarding, still image transfer, file exchange, database access, etc. System control 54 provides for the proper operation of the user station. It provides call control, capabilities exchange, signaling of commands and other messages. Network interface 55 formats the transmitted video, audio, data and control streams into messages for output to the network, and receives the video, audio, data and control streams messages from the network. The special purpose software of the present invention would utilize system control 54 and network interface 55. Generally, to practice the present multimedia conferencing invention, video codec 50 is not required.

While the present invention has been shown and described with respect to exemplary embodiments, it will be understood by those skilled in the art that modifications may be made thereto without departing from the scope and spirit of the invention. It is intended that the scope of the invention be defined by the claims appended hereto and their equivalents.

What is claimed is:

1. A multimedia user station, said multimedia user station capable of connecting to an IP network connected to a switched circuit network and participating in a multimedia conference call conducted over the IP network and the switched circuit network, said multimedia conference call comprising an audio portion conducted and maintained over the IP network and switched circuit network and an extra-audio portion conducted over the IP network, said multimedia user station comprising:
   special purpose software operated sometime after the audio portion of the conference call is established to:
      transmit the IP address of said multimedia user station in a message over the switched circuit network;
      negotiate extra-audio capabilities with other multimedia user stations on the conference call, said negotiation conducted over the IP network; and
      establish the extra-audio portion of the conference call with said other multimedia user stations, said extra-audio portion conducted over the IP network while the audio portion is maintained over the IP network and switched circuit network.

2. A multimedia user station according to claim 1, wherein said IP address message is transmitted in accordance to an in-band acoustic signaling protocol.

3. A multimedia user station according to claim 2, wherein said in-band acoustic signaling protocol is Frequency Shift Key (FSK).

4. A multimedia user station according to claim 2, wherein said in-band acoustic signaling protocol is Dual Tone Multi-Frequency (DTMF).

5. A multimedia user station according to claim 1, wherein said IP address messages is transmitted in accordance to an out-of-band signaling protocol.

6. A multimedia user station according to claim 5, wherein said out-of-band acoustic signaling protocol is Integrated Services Digital Network (ISDN).

7. A multimedia user station, said multimedia user station capable of connecting to an IP network connected to a switched circuit network and participating in a multimedia conference call conducted over the IP network and the switched circuit network, said multimedia conference call comprising an audio portion conducted and maintained over the IP network and switched circuit network and an extra-audio portion conducted over the IP network, said IP network including multipoint control unit (MCU) to conduct the multimedia conference, said multimedia user station comprising:
   special purpose software operated sometime after the audio portion of the conference call is established to:
      transmit the IP address of said multipoint control unit in a message over the switched circuit network;
      negotiate extra-audio capabilities with said multipoint control unit and one or more other multimedia user stations on the conference call, said negotiation conducted over the IP network; and
      establish the extra-audio portion of the conference call with said multipoint control unit and said other multimedia user stations, said extra-audio portion conducted over the IP network while the audio portion is maintained over the IP network and switched circuit network.

8. A multimedia user station according to claim 7, wherein said IP address. message is transmitted in accordance to an in-band acoustic signaling protocol.

9. A multimedia user station according to claim 8, wherein said in-band acoustic signaling protocol is Frequency Shift Key (FSK).

10. A multimedia user station according to claim 8, wherein said in-band acoustic signaling protocol is Dual Tone Multi-Frequency (DTMF).

11. A multimedia user station according to claim 7, wherein said IP address message is transmitted in accordance to an out-of-band signaling protocol.

12. A multimedia user station according to claim 11, wherein said out-of-band acoustic signaling protocol is Integrated Services Digital Network (ISDN).

13. A method to set up a multimedia conference over an Internet Protocol (IP) network connected to a switched circuit network, two or more multimedia user stations connected to the IP network and one or more standard telephone instruments connected to the switched circuit network, said multimedia conference call comprising an audio portion conducted and maintained over a combination of the IP network and circuit switched circuit network and an extra-audio portion conducted over the IP network, said two or more multimedia user stations capable of participating in the audio portion over the combination of IP network and switched circuit network and the extra-audio portion over the IP network, said one or more standard telephone instruments capable of participating in the audio portion over the switched circuit network, said method comprising:

establishing the audio portion via the combination of the IP network and switched circuit network between said two or more multimedia user stations and said one or more standard telephone instruments;

transmitting, by one of said two or more multimedia user stations, the IP address of said one of said two or more multimedia user stations in a message over the switched circuit network; and negotiating extra-audio capabilities by said one of said two or more multimedia user stations with the others of said two or more multimedia user stations on the conference call, said negotiation conducted over the IP network;

whereby said two or more multimedia user stations and said one or more standard telephone instruments conduct the audio portion of said conference call via said combination of the IP network and switched circuit network, and said two or more multimedia user stations conduct the extra-audio portion of said conference call over said IP network.

14. A method to set up a multimedia conference according to claim 13, wherein said IP address message is transmitted in accordance to an in-band acoustic signaling protocol.

15. A method to set up a multimedia conference according to claim 14, wherein said in-band acoustic signaling protocol is Frequency Shift Key (FSK).

16. A method to set up a multimedia conference according to claim 14, wherein said in-band acoustic signaling protocol is Dual Tone Multi-Frequency (DTMF).

17. A method to set up a multimedia conference according to claim 13, wherein said IP address message is transmitted in accordance to an out-of-band signaling protocol.

18. A method to set up a multimedia conference according to claim 17, wherein said out-of-band acoustic signaling protocol is Integrated Services Digital Network (ISDN).

19. A method to set up a multimedia conference over an Internet Protocol IP network connected to a switched circuit network, two or more multimedia user stations connected to the IP network and one or more standard telephone instruments connected to the switched circuit network, said multimedia conference call comprising an audio portion conducted and maintained over a combination of the IP network and circuit switched circuit network and an extra-audio portion conducted over the IP network, said two or more multimedia user stations capable of participating in the audio portion over the combination of IP network and switched circuit network and the extra-audio portion over the IP network, said one or more standard telephone instruments capable of participating in the audio portion over the switched circuit network, the IP network including a multipoint control unit (MCU) to conduct the multimedia conference, said method comprising:

establishing the audio portion via the combination of the IP network and switched circuit network between said two or more multimedia user stations and said one or more standard telephone instruments;

transmitting, by one said two or more multimedia user stations, the IP address of said MCU in a message over the switched circuit network; and negotiating extra-audio capabilities with said MCU by said two or more multimedia user stations on the conference call, said negotiations conducted over the IP network;

whereby said two or more multimedia user stations and said one or more standard telephone instruments conduct the audio portion of said conference call via said combination of the IP network and switched circuit network, and said two or more multimedia user stations conduct the extra-audio portion of said conference call over said IP network.

20. A method to set up a multimedia conference according to claim 19, wherein said IP address message is transmitted in accordance to an in-band acoustic signaling protocol.

21. A method to set up a multimedia conference according to claim 20, wherein said in-band acoustic signaling protocol is Frequency Shift Key (FSK).

22. A method to set up a multimedia conference according to claim 20, wherein said in-band acoustic signaling protocol is Dual Tone Multi-Frequency (DTMF).

23. A method to set up a multimedia conference according to claim 19, wherein said IP address message is transmitted in accordance to an out-of-band signaling protocol.

24. A method to set up a multimedia conference according to claim 23, wherein said out-of-band acoustic signaling protocol is Integrated Services Digital Network (ISDN).

* * * * *